United States Patent [19]

Martin

[11] Patent Number: 4,593,156

[45] Date of Patent: Jun. 3, 1986

[54] GROUNDED TIP DETECTOR

[75] Inventor: Philip T. Martin, Raleigh, N.C.

[73] Assignee: ITT Corporation, New York, N.Y.

[21] Appl. No.: 611,569

[22] Filed: May 18, 1984

[51] Int. Cl.[4] .............................................. H04M 3/08
[52] U.S. Cl. ............................ 179/16 AA; 179/18 FA; 179/81 R
[58] Field of Search ........... 179/16 AA, 16 F, 18 FA, 179/18 AH, 18 AD, 18 FG, 16 EA, 99 LC, 175.3 F, 84 R, 170 NC, 81 R

[56] References Cited

U.S. PATENT DOCUMENTS

| | | | |
|---|---|---|---|
| 3,772,477 | 11/1973 | Richards | 179/16 EA |
| 4,190,745 | 2/1980 | Jusinskas, Jr. et al. | 179/18 AH |
| 4,301,334 | 11/1981 | Lechner | 179/16 AA |
| 4,326,104 | 4/1982 | Bergida | 179/16 AA |
| 4,385,336 | 5/1983 | Takeshita et al. | 361/42 |
| 4,398,064 | 8/1983 | Formosa, Jr. | 179/18 AH |
| 4,429,185 | 1/1984 | Adrian et al. | 179/18 FA |

FOREIGN PATENT DOCUMENTS 0133806 10/1979 Japan .............................. 179/16 EA

OTHER PUBLICATIONS

"One Chip Closes in on SLIC Functions"; L. Brown et al., Electronic Design, Sep. 27, 1980, pp. 85-91.
Understanding Telephone Electronics, J. Fike et al., Texas Instruments Inc., through Radio Shack, pp. 6-15.

Primary Examiner—Gene Z. Rubinson
Assistant Examiner—R. Vaas
Attorney, Agent, or Firm—John T. O'Halloran; Thomas F. Meagher

[57] ABSTRACT

A grounded tip detector for use in a subscriber line circuit detects and indicates a tip-to-ground condition in the SLIC. Hysteresis and RC filtering are provided to assure a sharp switch-over of the tip-to-ground detection output and a reduction in the effect of ripple signals due to longitudinal currents.

5 Claims, 1 Drawing Figure

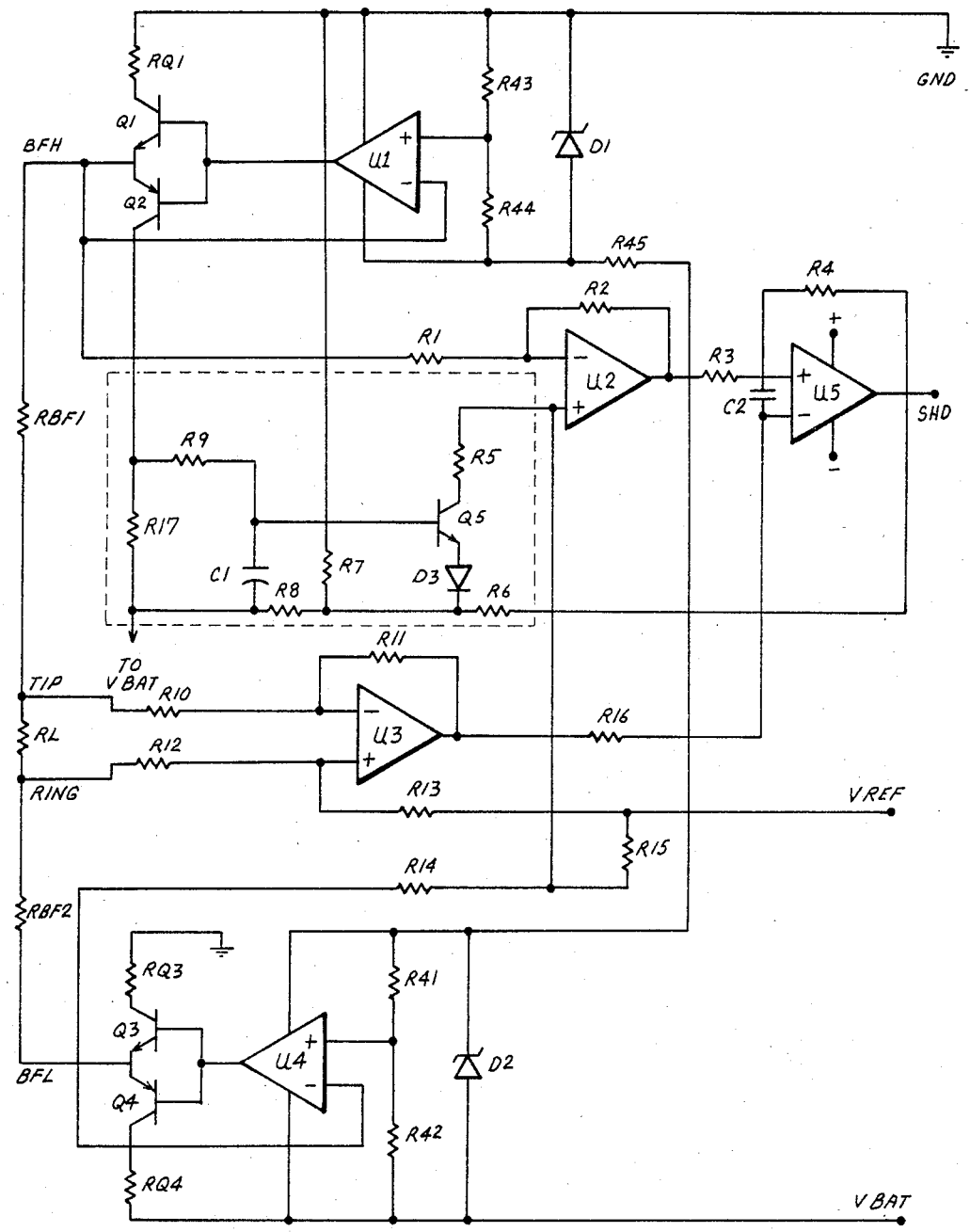

GROUNDED TIP DETECTOR

BACKGROUND OF THE INVENTION

1. Field of the Invention

This invention is related to apparatus for detecting and indicating a tip-to-ground short in a subscriber line interface circuit (SLIC).

2. Description of the Prior Art

Subscriber line interface circuits which couple a two-wire communication path with a four-wire communication path are known, e.g., as disclosed in U.S. Pat. No. 4,041,252 (Earl T. Cowden) and copending U.S. application Ser. No. 564,637, filed Dec. 22, 1983. A known variation of these circuits has the feature that if the ring lead is connected to ground potential, the switch hook detection (SHD) output will be activated thus indicating an off-hook condition. The persistence of this condition, even after the line is serviced, is a sign of a fault condition. Thus the SLIC detects the ring-to-ground condition. However, a tip-to-ground condition does not trip the SHD output and thus remains undetected. It would be desirable to have a SLIC that can also detect a tip-to-ground condition and indicate it via the SHD output. This invention is intended to provide such a tip-to-ground detection and indication capability.

SUMMARY OF THE INVENTION

Briefly, the present invention is a grounded tip detector for use in a subscriber line interface circuit. The invention detects a tip-to-ground condition in a SLIC and provides an indication of the tip-to-ground condition. Hysteresis and RC filtering are provided to assure a sharp switchover of the tip-to-ground detection output and a reduction in the effect of ripple signals due to longitudinal currents.

BRIEF DESCRIPTION OF THE DRAWING

FIG. 1 is a schematic diagram of an embodiment of a grounded tip detector according to the present invention.

DETAILED DESCRIPTION

The pertinent SLIC circuitry plus the circuitry GTD added to detect grounded tip is shown in FIG. 1. The amplifier U1, transistors Q1 and Q2, resistors R43 and R44, and zener diode D1 serve to set the DC potential of point BFH at a potential V1 volts below ground potential. Similarly U4, Q3 and Q4, R41 and R42, and D2 serve to set BFL at a DC potential V1 volts above the negative battery potential Vbat. R45 serves as a path for current to flow through D1 and D2, from ground potential to Vbat, so as to put D1 and D2 within their regulating current range. TIP is coupled to BFH via battery feed resistor RBF1 and RING is coupled to BFL via battery feed resistor RBF2. RBF1 and RBF2 would normally be chosen to each have a resistance value equal to one-half the AC impedance seen looking into the TIP and RING terminals from the subscriber line. RL represents the line resistance and may vary in value from zero to infinity ohms. When the phone is on-hook, RL is equal to the leakage resistance which is essentially infinite and is at least greater than approximately 15,000 ohms. Amplifier U2, along with resistors R1, R2, R14, and R15, form a differential amplifier referenced to the reference voltage Vref. The input to this differential amplifier is the voltage potential difference between BFH and BFL. Similarly U3, R10, R11, R12, and R13 form a differential amplifier referenced to Vref and whose input is the voltage potential difference between TIP and RING.

Amplifier U5 with resistors R3, R4, and R16, and capacitor C2 form a comparator with hysteresis such that if the non-inverting input of U5 goes positive with respect to the inverting input, then the output SHD goes positive. The positive output at SHD generates a positive voltage at the non-inverting input via R4 which offsets the non-inverting input from the inverting input and generates the hysteresis.

When the phone is on-hook, RL is greater than or equal to approximately 15,000 ohms and TIP and RING are effectively at the potential of BFH and BFL respectively. The U2 amplifier and resistors R1 and R2 are configured to have a fractional gain of K2 and the U3 amplifier and resistors R10 and R11 are configured to have a fractional gain of K3, with K3 greater than K2. As a result the inverting input potential of U5 is more negative than the non-inverting input potential and, thus, the output SHD is high. This is the normal on-hook condition. Essentially no current flows through either RBF1 or RBF2, and approximately no current flows through Q2 and sensing resistor R17.

If TIP is grounded, the full potential V1 at point BFH appears across RBF1 between TIP and BFH, and a current Ibf of V1/RBF1 flows into BFH and through Q2 and R17 to Vbat. Thus, a voltage Vbs equal to the product of Ibf times R17 appears across R17 when TIP is grounded, and across capacitor C1 via resistor R9. This voltage Vbs appears at the base of switching transistor Q5. The emitter of Q5 is connected to the junction of resistors R6, R7, and R8 which are selected to result in a voltage Vem at the emitter which is equal to twice V1 above Vbat. R17, R6, R7, and R8 are selected so that Vbs is more positive than Vem and so that Vem is more positive than Vbat. Diode D3 provides reverse voltage protection to the emitter of Q5. Thus, when TIP is not grounded, the base of Q5 is at Vbat and is negative with respect to its emitter. Since Q5 is an NPN transistor, it turns off. However, when TIP is grounded, Vbs at the base of Q5 turns Q5 on. The collector current of Q5 flows via resistor R5 to the non-inverting input of U2. The current, which is somewhat limited by R5, forces the output of U2 more negative than the output of U3. In turn, this forces the output SHD of U5 negative thus indicating an off-hook condition. Otherwise the output SHD of U5 is positive and indicates on-hook. The drop in the voltage of the output SHD of U5 is coupled back to the emitter of Q5 via R6 causing Vem to drop. This assures that once Q5 turns on sufficiently it remains on until the base voltage of Q5 decreases significantly, thus introducing hysteresis into the circuit. When TIP is grounded, the output of U3 also goes negative at its output. Thus, the inverting input of U5 goes negative correspondingly. However, the non-inverting input of U5 goes more negative and thus reverses the polarity of the differential input to U5, resulting in an indication of the off-hook condition.

A problem known in the telephony art involves the presence of longitudinal currents at TIP and RING due to exposure to inductive fields set up by adjacent 60 hertz power lines. These currents are absorbed at BFH and BFL, respectively, which are effectively zero impedance points at the 60 hertz longitudinal current frequency. When the current flows into BFH, it flows through Q2 and R17. When the current flows out, it flows through Q1 and RQ1. Thus the net current in R17 is alternate half sine wave cycles of the same polarity. The average current is, thus, one half that of the half-period average value. With an expected peak longitudinal current Ipeak, e.g., as set in the Rural Electrification Agency digital central office specification, the average current Iav is equal to $(\frac{1}{2}) \times ((2/pi) \times Ipeak)$ The average voltage Vav across R17 is, therefore, equal to the product of R17 times Iav. V1 is selected to be more than one-half the potential Vav. Thus by setting the emitter of Q5 at Vem, which is equal to twice V1 above Vbat to which R17 is connected, the base remains negative with respect to its emitter and Q5 stays off in the presence of longitudinal signals. However, the signal developed across R17 will include AC components with frequencies of 60 hertz and its harmonics. This ripple signal is filtered by R9 and C1 to control this effect by a factor which will reduce the expected peak AC component of the signal developed at the base of Q5 so as to further avoid the false triggering of Q5.

Hysteresis has been introduced into this circuit by connecting the output SHD of U5 to the emitter of Q5 via R6. This was done to assure a sharp switchover of the SHD output and immunity to ripple on R17 induced by longitudinal currents. However, it may be possible to use this circuit without R6 and its associated hysteresis. In particular, a larger time constant for the R9-C1 product would help in this regard as it reduces ripple effects.

In a particular embodiment of the invention, Vbat was selected to be a −50 volt DC battery potential and the offset voltage V1 was selected to be equal to 7.5 volts DC. The components selected resulted in Vbs equal to −26.7 volts DC, Vem equal to −35 volts DC, and Vav equal to 10 volts DC.

It is apparent that the operating points and the component values used can be changed and adjusted to achieve various goals of tip-to-ground detection versus component cost, count, and type, power consumption, and manufacturing cost. It is therefore the intention in the appended claims to cover all such modifications as may fall within the true spirit and scope of the invention.

I claim:

1. A grounded tip detection circuit for a subscriber line interface circuit having a tip lead, comprising:
    means for detecting a tip-to-ground condition, and
    means responsive to said detecting means for providing an indication of said tip-to-ground condition;
    wherein said detecting means comprises;
    means, coupled to said tip lead of said subscriber line interface circuit, operated in response to the connection of said tip lead to ground potential to generate a detection signal;
    wherein said detection signal generating means comprises;
    sensing means coupled to said tip lead and referenced to a battery potential, for sensing the potential at said tip lead, and
    a switching means, coupled to said sensing means, operated in response to a said potential sensing to generate said detection signal;
    wherein said sensing means comprises a sensing resistor and said switching means comprises a transistor which includes an emitter lead, a base lead, and a collector lead; and
    a resistor and capacitor in series combination connected in parallel with said sensing resistor, the point between said resistor and capacitor of said series combination connected to said base lead of said switching means, wherein said series combination provides AC filtering of said sensed tip lead potential.

2. The circuit of claim 1, further comprising:
    biasing means coupled to said emitter lead of said transistor operated to generate a biasing potential at said emitter lead which is less than a potential at said base lead when said tip lead is connected to ground potential and is more than a potential at said base lead when said tip lead is not connected to ground potential, said emitter lead biasing potential chosen relative to said potentials of said base lead so as to allow switching of said transistor.

3. The circuit of claim 2, wherein said biasing means provides said detection signal to said emitter lead so as to require a significant change in said base lead potential before said transistor switches.

4. The circuit of claim 1, wherein said biasing means is operated to generate a biasing potential at said emitter lead larger than a DC biasing potential at said base lead resulting from a longitudinal current flowing through said sensing resistor.

5. The circuit of claim 4, wherein said AC filtering reduces an expected peak AC component resulting from said longitudinal current.

* * * * *